United States Patent
Subramanian et al.

(10) Patent No.: US 11,430,221 B2
(45) Date of Patent: Aug. 30, 2022

(54) ENHANCING DETECTION OF OCCLUDED OBJECTS IN A MULTIPLE OBJECT DETECTION SYSTEM

(71) Applicant: Sensormatic Electronics, LLC, Boca Raton, FL (US)

(72) Inventors: Gopi Subramanian, Delray Beach, FL (US); Joseph Celi, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/019,038

(22) Filed: Sep. 11, 2020

(65) Prior Publication Data

US 2022/0083783 A1 Mar. 17, 2022

(51) Int. Cl.
| | | |
|---|---|---|
| *G06K 9/00* | (2022.01) | |
| *G06V 20/40* | (2022.01) | |
| *G06T 7/246* | (2017.01) | |
| *G06V 20/58* | (2022.01) | |
| *G06V 40/16* | (2022.01) | |
| *G06T 5/40* | (2006.01) | |

(52) U.S. Cl.
CPC ............ *G06V 20/46* (2022.01); *G06T 5/40* (2013.01); *G06T 7/246* (2017.01); *G06V 20/58* (2022.01); *G06V 40/161* (2022.01); *G06T 2207/10016* (2013.01)

(58) Field of Classification Search
CPC .......... G06K 9/00744; G06K 9/00805; G06K 9/00228; G06T 5/40; G06T 7/246; G06T 2207/10016
See application file for complete search history.

(56) References Cited

U.S. PATENT DOCUMENTS

| 9,898,677 | B1 * | 2/2018 | An jelkovi | ......... | G06K 9/00771 |
| 2014/0093127 | A1 * | 4/2014 | Mundhenk | ......... | G06K 9/00744 |
| | | | | | 382/103 |

(Continued)

OTHER PUBLICATIONS

Rathnayake Tharindu et al., "On-Line Visual Tracking with Occlusion Handling", Sensors. vol. 20, No. 3, Feb. 10, 2020, p. 929.

(Continued)

*Primary Examiner* — Dhaval V Patel
(74) *Attorney, Agent, or Firm* — ArentFox Schiff

(57) ABSTRACT

A system may be configured to perform enhanced detection of occluded objects in a multiple object detection system. In some aspects, the system may detect a plurality of current objects in a current video frame, generate initial object identifier mapping information assigning a candidate object identifier to a first object of the plurality of current objects, and detect a multi-object tracking (MOT) inaccuracy condition. Further, the system may generate a current fingerprint corresponding to the first object of the plurality of current objects, identify an assignment error based on comparing the current fingerprint to historic fingerprints associated with a plurality of historic objects detected in a previous frame, generate updated object identifier mapping information based on the assignment error, and display the current video frame based on the updated object identifier mapping information.

20 Claims, 9 Drawing Sheets

(56) References Cited

U.S. PATENT DOCUMENTS

2014/0347475 A1\* 11/2014 Divakaran ......... G06K 9/00771
 348/135
2016/0180546 A1\* 6/2016 Kim ....................... G06T 7/292
 382/103

OTHER PUBLICATIONS

Israni Dippal et al., "Identity Retention of Multiple Objects under Extreme Occlusion Scenarios using Feature Descriptors", Journal of Communications Software and Systems, vol. 14, No. 4, 2018., pp. 290-301.
Choi Jin-Woo et al., "Robust Multi-person Tracking for Real-Time Intelligent Video Surveillance", Etri Journal, vol. 37, No. 3, Jun. 2015, pp. 551-561.
Khan Gulraiz et al., "Multi-Person Tracking Based on Faster R-CNN and Deep Appearance Features", 2019.
Chavan Kapil et al., "Occlusion detection in video sequences", IOSR Journal of Computer Engineering, vol. 16, No. 5, 2014, pp. 1-8.
Possegger Horst et al., "Occlusion Geodesics for Online Multi-Object Tracking", 2014 IEEE Conference on Computer Vision and Pattern Recognition, IEEE, Jun. 23, 2014, pp. 1306-1313.

\* cited by examiner

400

402 Receiving a current video frame from a video capture device

404 Detecting, via an object detection system, a plurality of current objects in the current video frame

406 Generating, via a tracking system, initial object identifier mapping information, the initial object identifier mapping information assigning a candidate object identifier to a first object of the plurality of current objects

408 Detecting a multi-object tracking inaccuracy condition

410 Generating a current fingerprint corresponding to the first object of the plurality of current objects

412 Determining that the current fingerprint corresponds to a historic fingerprint associated with a first object of a plurality of historic objects detected in a previous video frame, the first object of the plurality of historic objects associated with a final object identifier

414 Generating updated object identifier mapping information, the updated object identifier mapping information assigning the final object identifier to the first object of the plurality of current objects

416 Displaying, based on the updated object identifier mapping information, the current video frame

*FIG. 4*

ENHANCING DETECTION OF OCCLUDED OBJECTS IN A MULTIPLE OBJECT DETECTION SYSTEM

BACKGROUND

The present disclosure relates generally to multiple object detection systems and multiple object tracking systems (collectively referred to herein as "MOTS"), and more particularly, to methods and systems for enhancing detection of occluded objects in a MOTS.

Many industries employ MOTS for a wide array of applications. For example, in the retail sector, MOTS may be used in people counting systems to monitor entry and exit into a retail location, traffic flow applications to monitor customer journeys within a retail location, and/or surveillance systems to detect unauthorized activity by retail customers with respect to retail articles offered for sale. Typically, MOTS rely on object detection systems that often fail to recognize occluded objects, and/or object tracking systems that utilize a limited set of information to track the locations of each object. As such, MOTS struggle to accurately track multiple moving objects over time when at least one of the objects is occluded during the tracking period. For example, a MOTS configured to track human beings may fail to accurately detect a first person when a second person crosses in between the first person and a video capture device (e.g., a camera) providing a video feed to the MOTS.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for enhancing detection of occluded objects in a MOTS. In an aspect, a method for enhancing detection of occluded objects in a MOTS may comprise receiving a current video frame from a video capture device; detecting, via an object detection system, a plurality of current objects in the current video frame; generating, via a tracking system, initial object identifier mapping information, the initial object identifier mapping information assigning a candidate object identifier to a first object of the plurality of current objects; detecting a multi-object tracking (MOT) inaccuracy condition; generating a current fingerprint corresponding to the first object of the plurality of current objects; determining that the current fingerprint corresponds to a historic fingerprint associated with a first object of a plurality of historic objects detected in a previous video frame, the first object of the plurality of historic objects associated with a final object identifier; generating updated object identifier mapping information, the updated object identifier mapping information assigning the final object identifier to the first object of the plurality of current objects; and displaying, based on the updated object identifier mapping information, the current video frame.

In some implementations, the current video frame is a second video frame, and the method may further comprise detecting, via the object detection system, the plurality of historic objects in a first video frame received prior to the second video frame; generating historic object identifier mapping information, the historic object identifier mapping information assigning the final object identifier to the first object of the plurality of historic objects; detecting an absence of the MOT inaccuracy condition; and generating the historic fingerprint based on the absence of the MOT inaccuracy condition.

In some implementations, generating the current fingerprint may comprise generating an image histogram corresponding to the first object of the plurality of current objects; or generating a facial identifier corresponding to a candidate face detected in the first object of the plurality of current objects. In some implementations, detecting the MOT inaccuracy condition may comprise identifying based on tracking information determined by the tracking system, the first object of the plurality of current objects within a threshold distance of an expected location of the first object of the plurality of historic objects; identifying based on tracking information determined by the tracking system, the first object of the plurality of current objects within a threshold distance of an expected location of the first object of the plurality of historic objects; or determining, based on tracking information determined by the tracking system, that the first object of the plurality of current objects is located at an unexpected location.

In some implementations, generating the updated object identifier mapping information comprises disassociating the candidate object identifier from the first object of the plurality of current objects. In some implementations, the candidate object identifier is a previously unassigned identification number or sequence of characters (e.g., a string).

In an aspect, a method for enhancing detection of occluded objects in a MOTS may comprise receive a current video frame from the video capture device; detect, via an object detection system, a plurality of current objects in the current video frame; generate, via a tracking system, initial object identifier mapping information, the initial object identifier mapping information assigning a candidate object identifiers to the plurality of current objects; detect a multi-object tracking (MOT) inaccuracy condition; generate a current fingerprint corresponding to a region of interest; identify a detection error based on comparing the current fingerprint to historic fingerprints associated with a plurality of historic objects detected in a previous video frame; generate updated object identifier mapping information based on the assignment error; and display, based on the updated object identifier mapping information, the current video frame.

In some implementations, detecting the MOT inaccuracy condition may comprise identifying a decrease in a number of the plurality of current objects; or determining that an expected location of a historic object of the plurality of historic objects is within a threshold distance of an occlusion location.

The present disclosure includes a system having devices, components, and modules corresponding to the steps of the described methods, and a computer-readable medium (e.g., a non-transitory computer-readable medium) having instructions executable by a processor to perform the described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 is a flow diagram of a first example of a method of enhancing detection of occluded objects in a MOTS, according to some implementations.

DETAILED DESCRIPTION

Figure 1:
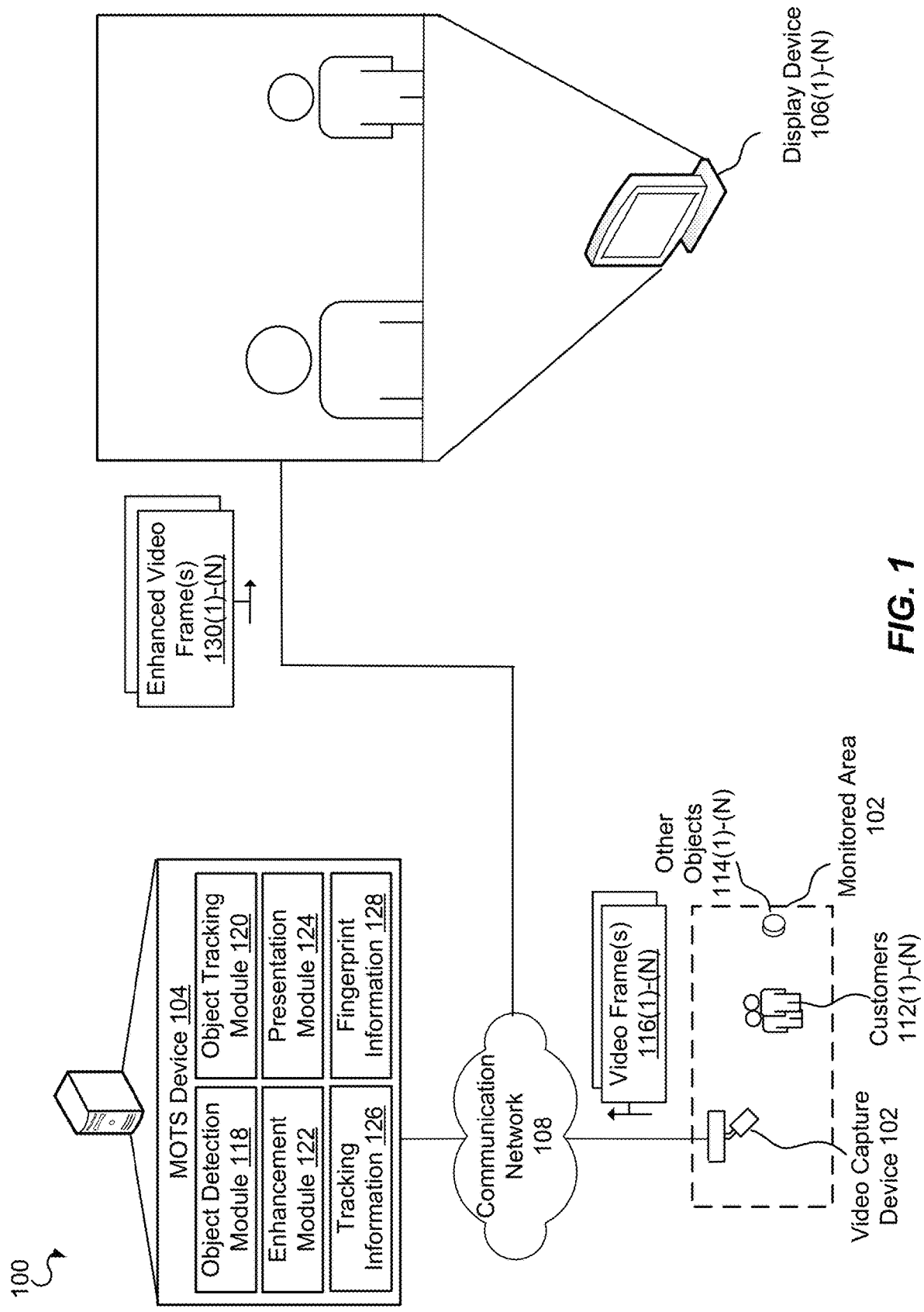
FIG. 1 is a block diagram of an example of a system for enhancing detection of occluded objects in a MOTS, according to some implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses that provide enhanced detection of occluded objects in a MOTS. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In some implementations, one or more problems solved by the present solution is enhancing detection of occluded objects in a MOTS. For example, this present disclosure describes systems and methods for enhancing detection of occluded objects in a MOTS configured to determine detection information identifying a plurality of objects in a video frame, generate tracking information based on the plurality of objects and a previous video frame, update object trajectory information, and display the video frame in real-time with overlay information based on the object trajectory information. As used herein, in some aspects, "real-time" may refer to receiving a live video feed, and determining the overlay information upon receipt of the live feed. The present solution provides improved accuracy in MOTS without reducing efficiency by leveraging unique fingerprint information to verify the detection information and the tracking information in contexts often associated with errors in MOTS.

Referring to FIG. 1, in one non-limiting aspect, a system 100 is configured to enhance detection of occluded objects in a MOTS. As illustrated in FIG. 1, the system 100 may include a video capture device 102, a MOTS device 104, and one or more display devices 106. Further, the system 100 may include a communication network 108. Further, the video capture device 102, the MOTS device 104, and the display devices 106(1)-(N) may communicate via the communication network 108. In some implementations, the communication network 108 may include one or more of a wired and/or wireless private network, personal area network, local area network, wide area network, or the Internet. Some examples of the display devices 106(1)-(N) include device monitors, wearable devices (e.g., optical head-mounted display, smartwatch, etc.), smart phones and/or mobile devices, laptop and netbook computing devices, tablet computing devices, digital media devices and eBook readers, or any other device having a display and/or connected to a display.

In some aspects, the video capture device 102 may be configured to capture a video feed of object activity within a monitored area 110. In some examples, the monitored area 110 may be a retail environment and the objects may be customers and/or retail articles offered for sale within the monitored area 110. For instance, the customers 112(1)-(N) may be currently shopping within the monitored area 110 for one or more other objects 114(1)-(N). As a result, the video capture device 102 may capture video frames 116(1)-(N) including the activity of the customers 112(1)-(N) within the monitored area 110, and send the video frames 116(1)-(N) to the MOTS devices 104 via the communication network 108. Although FIG. 1 illustrates one video capture device 102 and one monitored area 110, in some other implementations the system 100 may include any number of video capture devices and any number of monitored areas.

In some aspects, the MOTS device 104 may be configured to detect multiple objects within the video frames 116(1)-(N), and track the movement of the objects within the video frames 116(1)-(N). For example, the MOTS device 104 may be configured to detect the customers 112(1)-(N) within the video frames 116(1)-(N), and track the movement of the customers 112(1)-(N) throughout the monitored area 110 using the video frames 116(1)-(N). In some aspects, the MOTS device 104 may be employed to monitor the amount of customers 112(1)-(N) within the monitored area 110, determine customer journeys of the customers 112(1)-(N) within the monitored area 110, and/or implement a surveillance system to prevent theft of the other objects 114(1)-(N) offered for sale within the monitored area 110.

As illustrated in FIG. 1, the MOTS device 104 may include an object detection module 118, a tracking module 120, an enhancement module 122, a presentation module 124, tracking information 126, and fingerprint information 128. The object detection module 118 may be configured to detect objects within the video frames 116(1)-(N). For example, the object detection module 122 may be configured to detect the customers 112(1)-(N) within the video frames 116(1)-(N). In some aspects, the object detection module 122 may employ a convolution neural network to detect objects within the video frames 116(1)-(N). Additionally, or alternatively, the object detection module 122 may employ one or more other machine learning (ML) techniques to detect objects within the video frames 116(1)-(N).

In some aspects, the object detection module 118 may be configured to determine a boundary representation for each detected object. For example, the object detection module 118 may determine a boundary box for each of the customers 112(1)-(2) within the video frame 116(3). In addition, the object detection module 118 may provide the boundary representations to the object tracking module 120 and the enhancement module 122. Additionally, the object detection module 118 may be configured to determine a predicted class of a detected object and confidence score representing the likelihood that the detected object belongs to the class. Further, the predicted class and confidence score may also be provided to the object tracking module 120 and the enhancement module 122 with their corresponding boundary representation.

The object tracking module 120 may be configured to generate tracking information 126 indicating the trajectory of the objects detected by the object detection module 118. For example, the tracking information 126 may include data representing the trajectory of the customers 112(1)-(2) between the video frames (e.g., the video frames 116(1)-(2)) received from the video capture device 102. In particular, the object tracking module 120 may determine if each current boundary representation generated by the object detection module 118 with respect to a video frame 116(3) has a corresponding historic boundary representation in the preceding video frame 116(2). In some instances, the object tracking module 120 may employ the predicted class information and confidence score information to determine if a current boundary representation has a corresponding historic boundary representation.

If the object tracking module 120 determines that a current boundary representation has a corresponding historic boundary representation in a preceding video frame (e.g., the video frame 116(1)), the object tracking module 120 assigns the object identifier of the corresponding historic boundary representation to the current boundary representation. If the object tracking module 120 determines that a current boundary representation does not have a corresponding historic boundary representation in the preceding video frame 116(2), the object tracking module 120 assigns a new object identifier to the current boundary representation. For example, the object tracking module 120 may determine that the boundary representation corresponding to the customer 112(1) corresponds to a historic boundary representation, and the boundary representation corresponding to the customer 112(2) does not have a corresponding to boundary representation. In response, the object tracking module 120 may assign an existing object identifier to the boundary representation corresponding to the customer 112(1), and generate a new object identifier for the boundary representation corresponding to the customer 112(2).

In addition, the object tracking module 120 may determine an expected location of the boundary representations in a subsequent video frame (e.g., the next video frame 116(4)). In some aspects, the tracking information 126 may include the object identifier of each object (e.g., the customers 112(1)-(N)), the trajectory of each object (the customers 112(1)-(N)) across the video frames 116(1)-(N) as the video frames 116(1)-(N) are received at the MOTS device 104, and the expected location of each object (the customers 112(1)-(N)) in the next video frame 116(4). Further, the object tracking module 120 may send the tracking information 126 to the MOTS device 104.

In some aspects, the object tracking module 120 or the enhancement module 122 may generate a fingerprint for each newly detected object. For example, the object tracking module 120 or the enhancement module 122 may generate a fingerprint for the boundary representation corresponding to the customer 112(2). In some aspects, generating a fingerprint may include generating an image histogram corresponding to the boundary representation corresponding to the customer 112(2). Further, the image histogram may be based on intensity values (e.g., the intensity values of pixels) within the boundary representation. In some other aspects, generating a fingerprint may include generating a facial identifier corresponding to a candidate face detected in the boundary representation corresponding to the customer 112 (2). In some aspects, the facial identifier may comprise vectors of facial landmarks defining the candidate face. As used herein, in some aspects, a facial landmark may refer to a descriptor that may be used to define a face. Some examples of a facial landmark may include the left eyebrow outer corner, left eyebrow inner corner, right eyebrow outer corner, right eyebrow inner corner, left eye outer corner, left eye inner corner, right eye outer corner, right eye inner corner, nose tip, left mouth corner, right mouth corner, eye centers, left temple, right temple, chin tip, cheek contours, left eyebrow contours, right eyebrow contours, upper eyelid centers, lower eyelid centers, nose saddles, nose peaks, nose contours, mouth contours, the distance between the eye centers, the distance between the nose tip and lips, etc. Additionally, the object tracking module 120 or the enhancement module 122 may generate a fingerprint for a region of interest. For example, the object tracking module 120 or the enhancement module 122 may generate a fingerprint for an expected location of a historic object of a previously-detected object, or one or more areas within a threshold distance from an occlusion location (e.g., a known occlusion location, or an areas around another detected object).

Further, the enhancement module 122 may be configured to determine whether the current frame is indicative of one or more MOT inaccuracy conditions. In some aspects, the enhancement module 122 may employ the tracking information 126 to identify the MOT inaccuracy conditions. If the current video frame 116(3) is not indicative of a MOT inaccuracy condition, the enhancement module 122 may finalize the tracking information 126 received from the object tracking module 120. If the current frame 116(3) is indicative of a MOT inaccuracy condition, the enhancement module 122 may perform an enhancement process.

In some aspects, the enhancement module 122 may detect a MOT inaccuracy condition by identifying an unexpected change in the amount of object identifiers associated with a video frame 116. For example, the enhancement module 122 may determine that the amount of object identifiers associated with the video frame 116(3) is an unexpected decrease from the amount of object identifiers associated with the preceding video frame 116(2) based on the expected locations of the boundary representations corresponding to the objects detected in the video frame 116(2). For instance, in the preceding video frame 116(2), the expected locations determined with respect to video frame 116(2) may have predicted that the amount of object identifiers associated with video frames 116(2)-(3) would be equal. In some examples, the decrease may be caused by one of the previously detected objects being occluded in the video frame 116(3) or another cause of detection error (e.g., poor lighting, distorted video frame, etc.). In some other aspects, the enhancement module 122 may detect a MOT inaccuracy condition by identifying that an expected location of a previously-detected object is within threshold distance of a known occlusion location or another detected object. For example, while processing video frame 116(3), the enhancement module 122 may determine that the expected location of the boundary representation corresponding to the customer 112(3) is within a threshold distance of a known occlusion location (e.g., a statue or column) within the monitored area 110.

Upon detection of the MOT inaccuracy conditions, the enhancement module 122 may determine if the object detection module 118 and the object tracking module 120 have failed to identify a previously detected object that is still within the monitored area 110. For example, the object tracking module 120 or the enhancement module 122 may generate one or more fingerprints each corresponding to a region of interest, and compare the fingerprints to a plurality of historic fingerprints associated with a plurality of historic objects detected in a previous video frame (e.g., the video frames 116(1)-(2)). If a fingerprint matches a historic fingerprint, the enhancement module 122 may update the tracking information 126 by adding another object corresponding to the region of interest associated with the fingerprint, and assigning the object identifier of the historic object represented by the historic fingerprint to the added object. In some aspects, the region of interests may be determined based on known static occlusion areas within the monitored area 110 (e.g., locations within the monitored area having structures that block the field of view of the video capture device 106). Additionally, or alternatively, the region of interests may be determined based on expected locations of previously-detected objects and/or areas around objects detected within the video frame 116(3). As such, the enhancement module 122 may be configured to inspect areas within the video frame 116(3) likely to have occluded objects.

In some aspects, the enhancement module 122 may detect a MOT inaccuracy condition by identifying that a detected object is within a threshold distance of an expected location of a previously-identified object. For example, while processing the video frame 116(3), the enhancement module 122 may detect a MOTS inaccuracy condition based at least in part on the boundary representation corresponding to the customer 112(2) being in a location of a boundary representation corresponding to an object previously detected in a preceding video frame 116(1). In some other aspects, the enhancement module 122 may detect a MOT inaccuracy condition in response to detecting a potential crossing event between a first detected object and a second detected object. For example, while processing the video frame 116(3), the enhancement module 122 may detect a MOTS inaccuracy condition based at least in part on identifying that the boundary representation corresponding to the customer 112(1) may have crossed paths with the boundary representation corresponding to the customer 112(2). In yet still some other aspects, the enhancement module 122 may detect a MOT inaccuracy condition in response to detecting a new object in an unexpected location indicative of a false positive. For example, while processing the video frame 116(3), the object detection module 118 may incorrectly identify the other object 114(1) as a human face. In response, the object tracking module 120 may assign an object identifier to the other object 114(1). Further, the enhancement module 122 may detect a MOTS inaccuracy condition based at least in part on the location of object 114(1) within the video frame 114(1) being in an unexpected location. In some aspects, the enhancement module 122 may determine that the location is unexpected based at least in part on the likelihood that the first appearance of the other object 114(1) would occur in the current location of the other object 114(1). As an example, in a room with one entry way, it would be unlikely for a human's first appearance to be in an area of the room opposite the entry way.

Upon detection of the MOT inaccuracy condition, the enhancement module 122 may determine if the object detection module 118 and the object tracking module 120 has incorrectly assigned a new object identifier to a previously detected object or incorrectly swapped candidate object identifiers of previously detected objects. For example, the object tracking module 120 or the enhancement module 122 may generate a fingerprint for a newly-detected object, and compare the fingerprints to a plurality of historic fingerprints associated with a plurality of historic objects detected in a previous video frame (e.g., the video frames 116(1)-(2)). If the fingerprint matches a historic fingerprint, the enhancement module 122 may assign the object identifier of the historic object represented by the historic fingerprint to the newly-detected object within the tracking information 126. As another example, in response to a crossing event, the enhancement module 122 may generate fingerprints for the objects within a threshold distance of the crossing event, and verify that the object tracking module 120 has not incorrectly swapped object identifiers for two or more objects due to the crossing event by comparing the fingerprint to a plurality of historic fingerprints associated with a plurality of historic objects detected in a previous video frame (e.g., the video frames 116(1)-(2)). If a fingerprint for a current object having a first object identifier matches a fingerprint for a historic object having a second object identifier, the enhancement module 122 may update the tracking information 126 so that the current object has the second object identifier and disassociating the first object identifier and the current object within the tracking information 126. As such, the enhancement module 122 may be configured prevent a crossing event from corrupting the tracking information 126.

Further, after the enhancement module 122 has verified the tracking information 126, the presentation module 124 may be configured to display the video frames 116(1)-(N) and the verified tracking information 126 via the display device 106. For example, the presentation module 124 may generate an enhanced video frame 130(3) with an overlay of the tracking information (e.g., object identifiers, trajectory information, etc.) over the detected objects captured in the video frame 116(3), and display the enhanced video frame 130(3) via the display device 106.

Figure 2A:
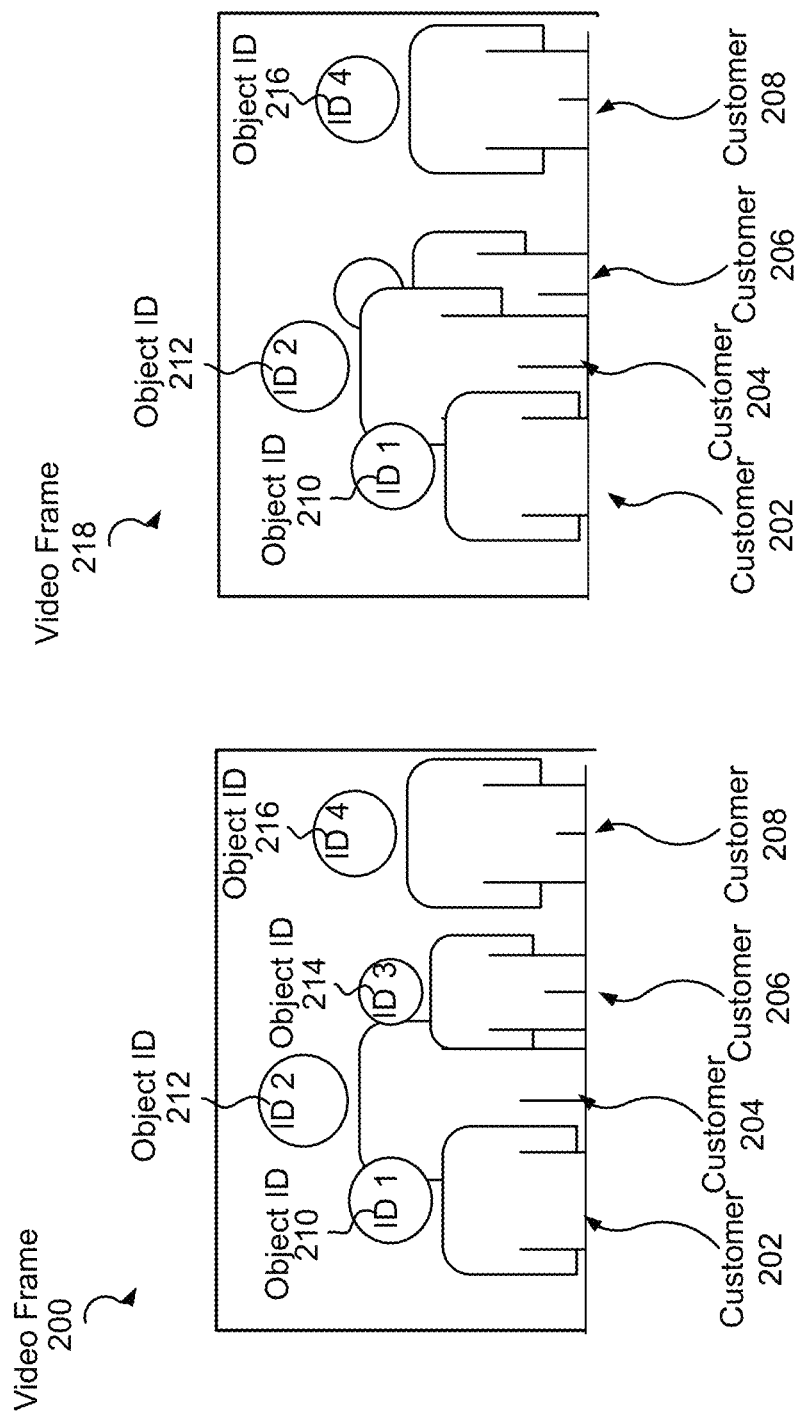
FIG. 2A is a first example of a MOTS inaccuracy condition, according to some implementations.

FIG. 2A is an example of a first MOTS inaccuracy condition (i.e., reduced object identifier count), according to some implementations. As illustrated in FIG. 2A, based off of a first video frame 200, the MOTS device 104 may detect a first customer 202, a second customer 204, a third customer 206, and a fourth customer 208. Further, the MOTS device 104 may assign a first object identifier 210 to the first customer 202, a second object identifier 212 to the second customer 204, a third object identifier 214 to the third customer 206, and a fourth object identifier 216 to the fourth customer 208.

Further, the third customer 210 may move behind or otherwise be occluded by the second customer within the next video frame 218. As such, the MOTS device 104 may fail to detect the third customer 206 within the video frame 218. Further, the amount of object identifiers associated with the video frame 218 will be less than the amount of object identifiers associated with the video frame 200. In some aspects, the enhancement module 122 may detect a MOT inaccuracy condition based upon the decrease in object identifiers between video frames 200 and 218.

Figure 2B:
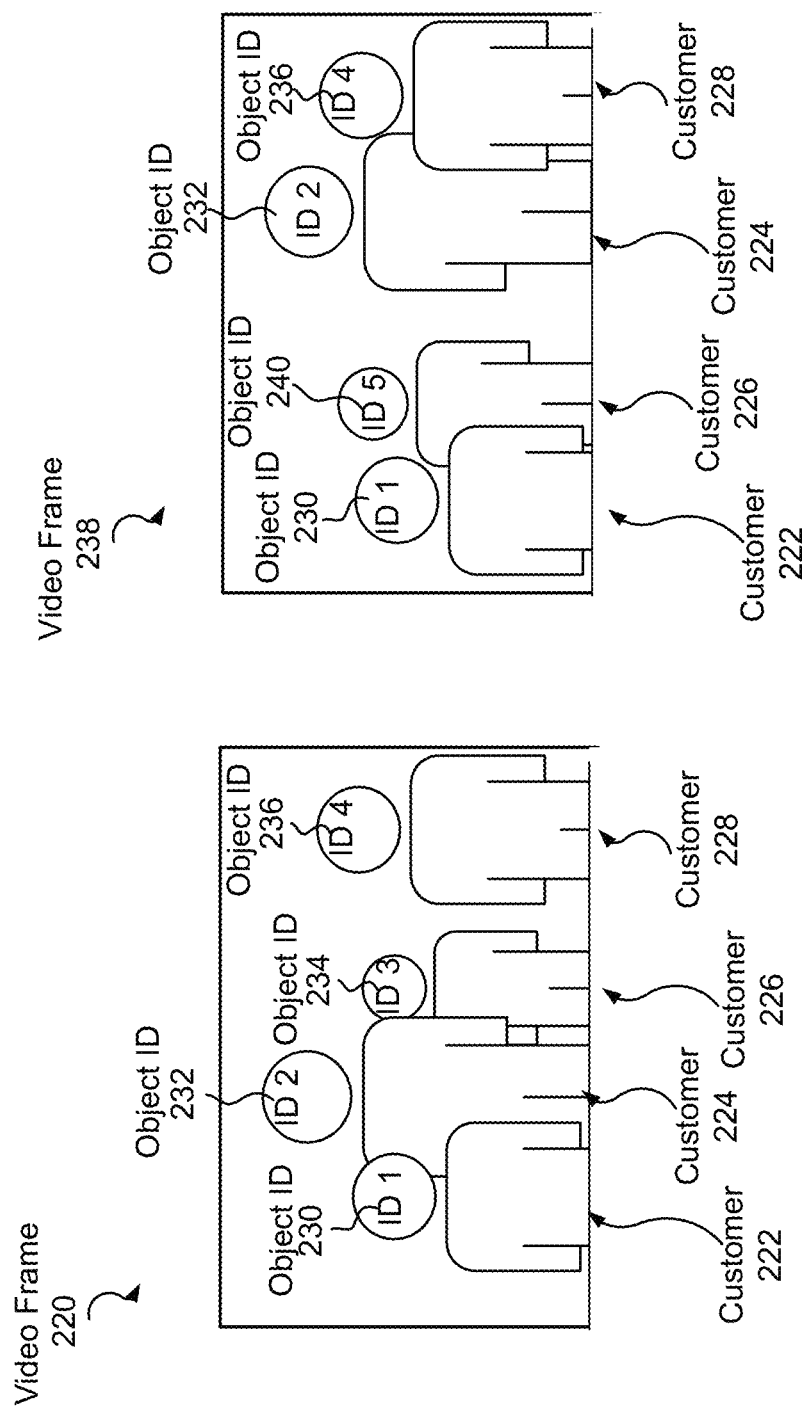
FIG. 2B is a second example of a MOTS inaccuracy condition, according to some implementations.

FIG. 2B is an example of a second MOTS inaccuracy condition (i.e., crossing event), according to some implementations. As illustrated in FIG. 2B, based off of a first video frame 220, the MOTS device 104 may detect a first customer 222, a second customer 224, a third customer 226, and a fourth customer 228. Further, the MOTS device 104 may assign a first object identifier 230 to the first customer 222, a second object identifier 232 to the second customer 224, a third object identifier 234 to the third customer 226, and a fourth object identifier 238 to the fourth customer 228.

Further, the third customer 226 may cross behind the second customer between the first video frame 220 and a second video frame 238. In some instances, the MOTS device 104 may identify the third customer 226 as a new object within the video frame 238, and assign another object identifier 240. In some other instances, the MOTS device 104 may swap the object identifiers of the second customer 224 and the third customer 226. In some aspects, the enhancement module 122 may detect a MOT inaccuracy condition based upon the crossing event between the second customer 224 and the third customer 226, and/or the probability that crossing is occurring or may have occurred. In some aspects, the enhancement module 122 may determine the probability that a crossing event is occurring or may have occurred based on the trajectory information of the second customer 224 and the third customer 226. Further, the enhancement module 122 may employ coordinates of an object representation (e.g., bounding box, centroid, etc.) of the second customer 224 and the third customer 226 to determine the probability that a crossing event is occurring or may have occurred.

Figure 2C:
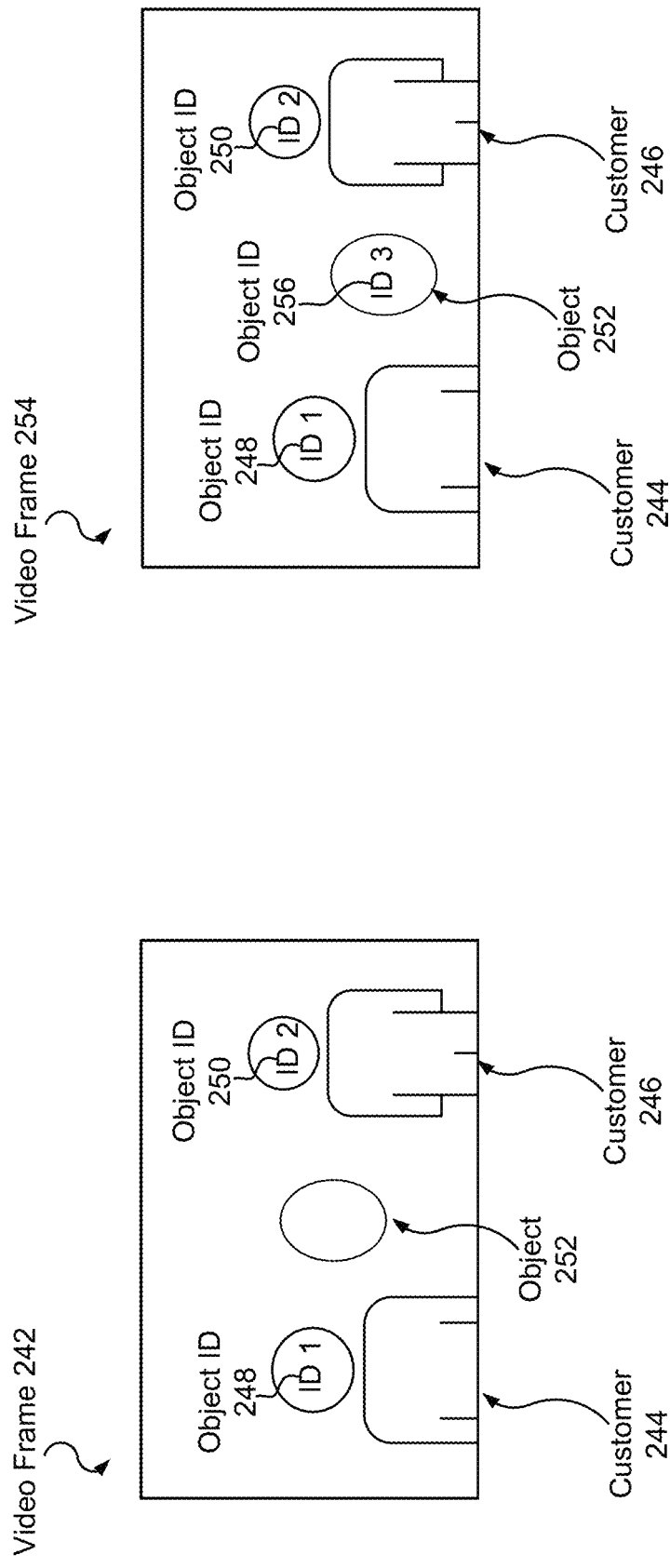
FIG. 2C is a third example of a MOTS inaccuracy condition, according to some implementations.

FIG. 2C is an example of a third MOTS inaccuracy condition (i.e., false positive), according to some implementations. As illustrated in FIG. 2C, based off of a video frame 242, the MOTS device 104 may detect a first customer 244 and a second customer 246. Further, the MOTS device 104 may assign a first object identifier 248 to the first customer 244 and a second object identifier 250 to the second customer 246. Further, the MOTS device 104 may correctly determine that the object 252 should not be tracked and assigned an object identifier. Subsequently, based off of the next video frame 254, the MOTS device 104 may incorrectly determine that the object 252 should be tracked and assigned the third object identifier 256. Further, in some aspects, the enhancement module 122 may detect a MOT inaccuracy condition based at least in part on the misrecognition of the object 252 as a customer and assignment of the object identifier 256 to the object 252. For example, the enhancement module 122 may detect a MOT inaccuracy condition based on the object 252 being a newly-detected object in an unexpected location (i.e., the middle of the video frame 254).

Figure 2D:
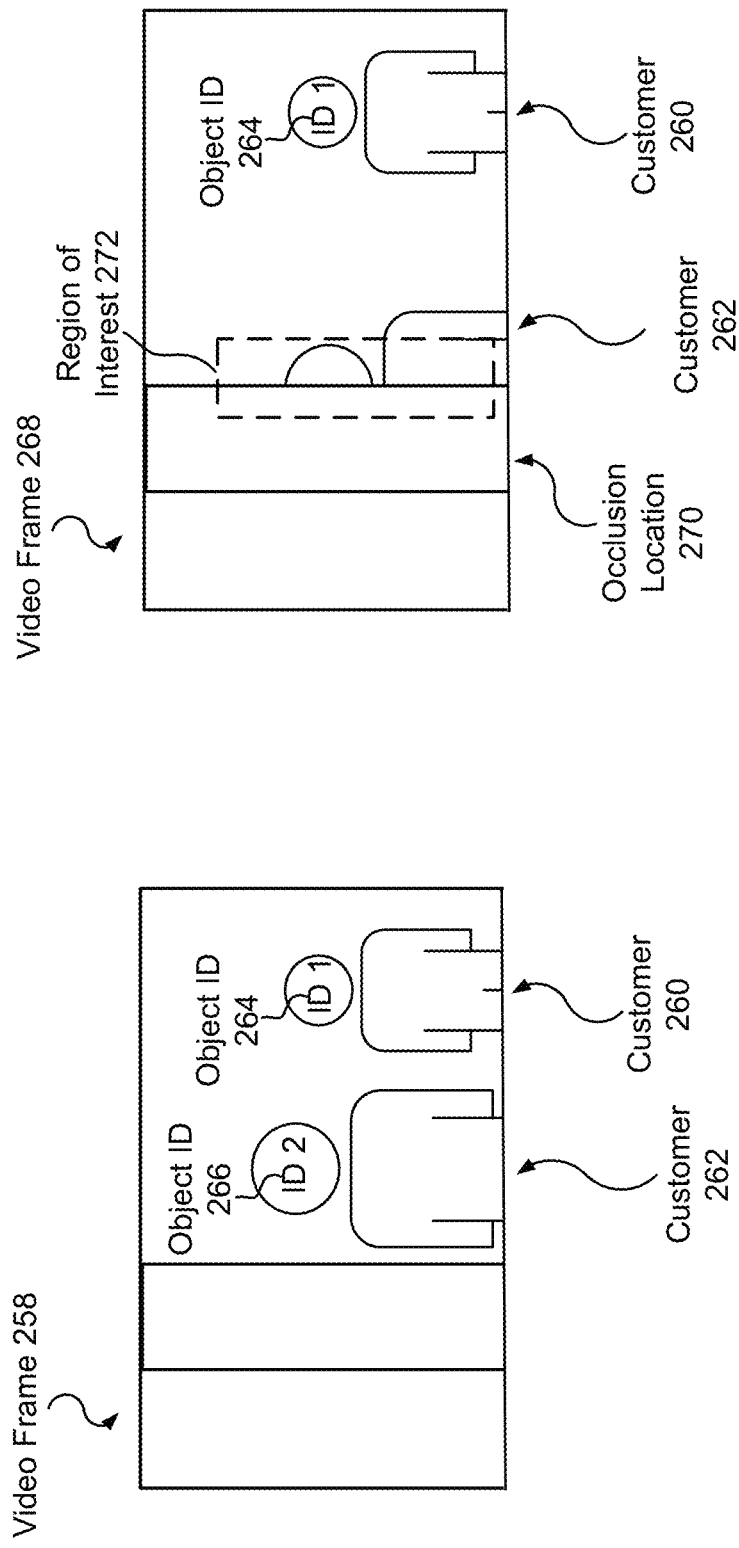
FIG. 2D is a fourth example of a MOTS inaccuracy condition, according to some implementations.

FIG. 2D is an example of a fourth MOTS inaccuracy condition (i.e., occlusion location), according to some implementations. As illustrated in FIG. 2D, based off of a first video frame 258, the MOTS device 104 may detect a first customer 260 and a second customer 262. Further, the MOTS device 104 may assign a first object identifier 264 to the first customer 260 and a second object identifier 266 to the second customer 262.

Further, the second customer 262 may move behind a column in the monitored area 110 or otherwise be occluded in the next video frame 268. As such, the MOTS device 104 may fail to detect the second customer 262 within the video frame 268. In some aspects, the enhancement module 122 may detect a MOT inaccuracy condition based on the proximity of the second customer 262 to a known occlusion location 270 (i.e., the column). In some aspects, the enhancement module 122 may perform employ machine learning or pattern recognition techniques to identify the occlusion location 270. In some other aspects, an operator of the MOTS device 104 may manually identify the occlusion location 270. Further, in some aspects, the enhancement module 122 may determine that the second customer 262 is within a threshold distance of the column by determining an expected location of the second customer in the video frame 268 based on video frame 258 and the tracking information 126. As described in detail herein, the enhancement module 122 may employ the region of interest 272 in response to identifying a MOTS inaccuracy condition based on an occlusion.

Figure 3:
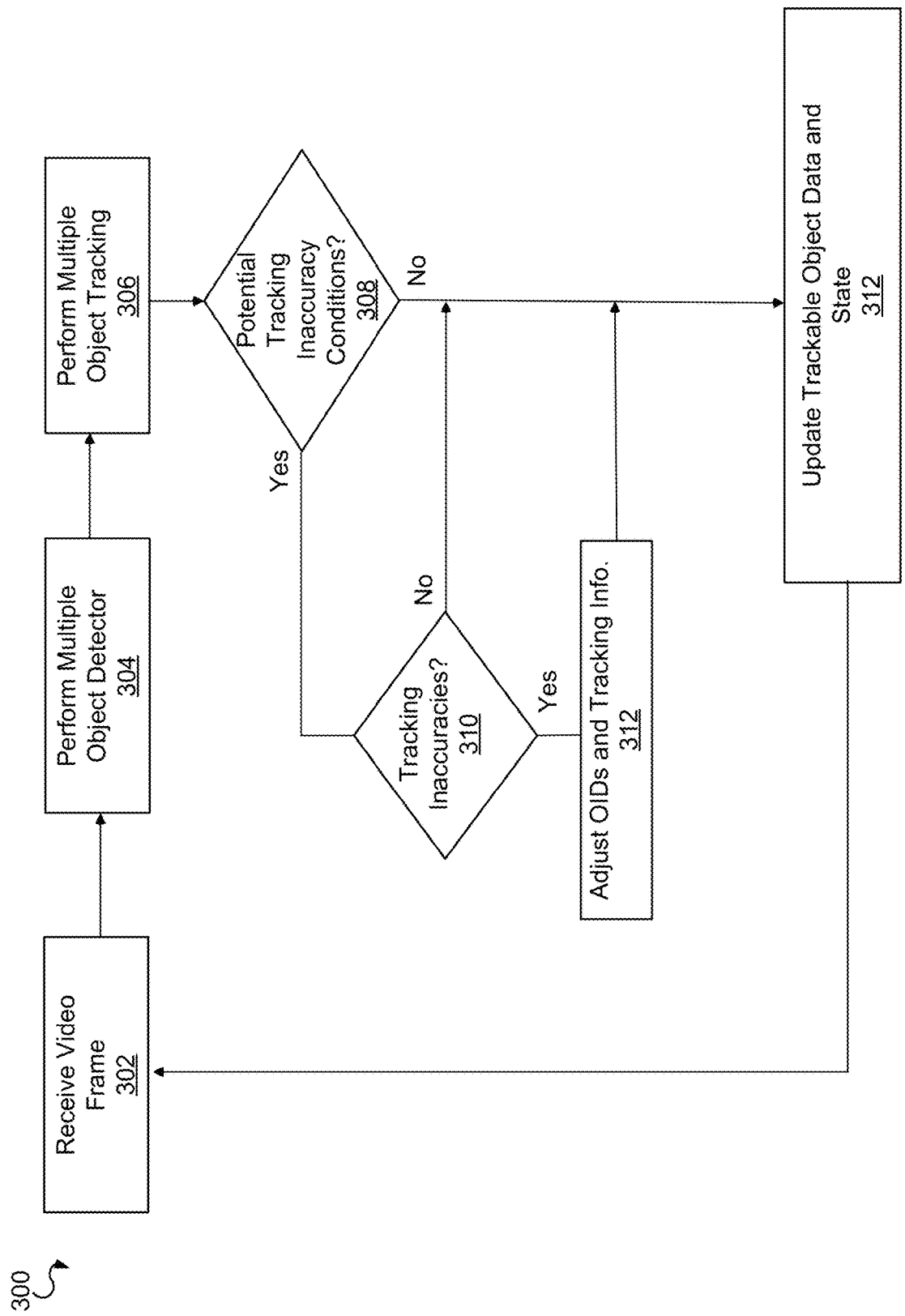
FIG. 3 is a flowchart of an example of a method of enhancing detection of occluded objects in a MOTS, according to some implementations.

FIG. 3 is a flowchart of an example of a method of enhancing detection of occluded objects in a MOTS, according to some implementations. At block 302, the MOTS device 104 may receive a video frame 116(1) from the video capture device 102. At block 304, the MOTS device 104 may detect multiple objects within the video frame 116(1) and generate a bounding box for each detected object. At block 306, the MOTS device 104 may perform multiple object tracking on the detected objects using the bounding boxes and tracking information 126, and generate candidate tracking information for the detected objects. In some aspects, the candidate tracking information may include candidate object identifiers for the detected objects and candidate trajectory information. At block 308, the MOTS device 104 may determine whether there any tracking inaccuracy conditions. For example, the MOTS device 104 may determine whether there has been an unexpected decrease in the amount of object identifiers, a potential crossing event, a potential occlusion based on a known occlusion location, a newly-detected object within a threshold distance of a previously-detected object, and/or a newly detected object in an unexpected location. If the MOTS device 104 determines that there may be a potential tracking inaccuracy condition, the MOTS device 104 may proceed to block 310. If the MOTS device 104 determines that there are not any potential tracking inaccuracy conditions, the MOTS device 104 may proceed to block 312.

At block 310, the MOTS device 104 may determine whether there are any tracking inaccuracies by comparing fingerprints generated based on the newly-detected objects or regions of interest to one or more historic fingerprints of the fingerprint information 128. As described in detail herein, each historic fingerprint may correspond to a previously-detected object. If a fingerprint matches a historic fingerprint, then a tracking inaccuracy exist. If the MOTS device 104 identifies a tracking inaccuracy, the MOTS device 104 may proceed to block 314. At block 314, the MOTS device may adjust the candidate object identifiers and candidate tracking information corresponding to each tracking inaccuracy. For example, for each fingerprint that matches a historic fingerprint, the MOTS device 104 may update the candidate object identifier and candidate tracking information, to reflect that the corresponding newly-detected object or region of interest is the previously-detected object having the matching historic fingerprint.

At block 312, the MOTS device may update the tracking information 126 with the verified candidate object identifiers and candidate tracking information. Further, the MOTS device 104 may repeat the process 300 for the next video frame 116(2) in the video feed captured by the video capture device 102.

Referring to FIG. 4, in operation, the MOTS device 104 or computing device 600 may perform an example method 400 for enhancing detection of occluded objects in a MOTS. The method 400 may be performed by one or more components of the MOTS device 104, the computing device 600, or any device/component described herein according to the techniques described with reference to FIG. 1.

At block 402, the method 400 includes receiving a current video frame from a video capture device. For instance, the MOTS device 104 may receive a video frame 116(3) from the video capture device 102 after having received the video frames 116(1)-(2) from the video capture device 102 at an earlier time. As an example, the video frame 116(3) may capture activity by or images of the customers 112(1)-(3) within the monitored area 110.

At block 404, the method 400 includes detecting, via an object detection system, a plurality of current objects in the current video frame. For example, the object detection module 118 may detect the customers 112(1)-(3) and the other object 114(1) within the video frame 116(3). In some aspects, the object detection module 118 may generate bounding boxes for each of the customers 112(1)-(3) and the other object 114(1) detected within the video frame 116(3)

At block 406, the method 400 includes generating, via a tracking system, initial object identifier mapping information, the initial object identifier mapping information assigning a candidate object identifier to a first object of the plurality of current objects. For instance, the object tracking module 120 may generate candidate tracking information including assignments of a unique candidate object identifier to each of the customers 112(1)-(3) and the other object 114(1) detected within the video frame 116(3) by the object detection module 118. As an example, the object tracking module may determine the customer 112(3) and the other object 114(1) are newly detected and assign each of the customer 112(3) and the other object 114(1) an unused candidate object identifier.

At block 408, the method 400 includes detecting a multi-object tracking (MOT) inaccuracy condition. For example, the enhancement module 122 may determine that there has been a potential crossing event between the customer 112(1) and 112(2) as described with respect to FIG. 2B. As another example, the enhancement module 122 may determine that the customer 112(3) is located within a threshold distance of an expected location of a previously-detected customer 112(4). As yet still another example, the enhancement module 122 may determine that the other object 114(1) is located in an unexpected location for a newly-detected object as described with respect FIG. 2C.

At block 410, the method 400 includes generating a current fingerprint corresponding to the first object of the plurality of current objects. For example, the enhancement module 122 may generate a fingerprint corresponding to the customer 112(3) within the video frame 116(3). In some aspects, the enhancement module 122 may generate a fingerprint in response to the object tracking module 120 assigning an unused object identifier to the customer 112(3). In some aspects, generating a fingerprint may include generating an image histogram corresponding to the boundary box corresponding to the customer 112(3). Further, the image histogram may be based on intensity values within the boundary representation. In some other aspects, generating a fingerprint may include generating a facial identifier corresponding to a candidate face detected in the boundary box corresponding to the customer 112(3).

At block 412, the method 400 includes determining that the current fingerprint corresponds to a historic fingerprint associated with a first object of a plurality of historic objects detected in a previous video frame, the first object of the plurality of historic objects associated with a final object identifier. For example, the enhancement module 122 may compare the fingerprint to a plurality of historic fingerprints, and determine that the fingerprint of the customer 112(3) matches a historic fingerprint previously generated when the video frame 116(2) was processed by the MOTS device 104. Further, the historic fingerprint may be associated with a previously-assigned object identifier different from the candidate object identifier assigned to the customer 112(3). In some aspects, comparing the fingerprint to the plurality of historic objects may be processor intensive. Therefore, limiting the fingerprint comparison to contexts in which the MOTS device 104 has detected a MOT inaccuracy condition improves the accuracy of the MOTS device 104 without significantly burdening the efficiency of the MOTS device 104.

At block 414, the method 400 includes generating updated object identifier mapping information, the updated object identifier mapping information assigning the final object identifier to the first object of the plurality of current objects. For example, the enhancement module 122 may update the object identifier of customer 112(3) from the candidate object identifier to the previously-assigned object identifier corresponding to the historic fingerprint within the tracking information 126.

At block 416, the method 400 includes displaying, based on the updated object identifier mapping information, the current video frame. For example, the presentation module 124 may generate the enhanced video frame 130(3) with the previously-assigned object identifier presented over the customer 112(3), and display the enhanced video frame 130(3) via the display device 106.

Figure 5:
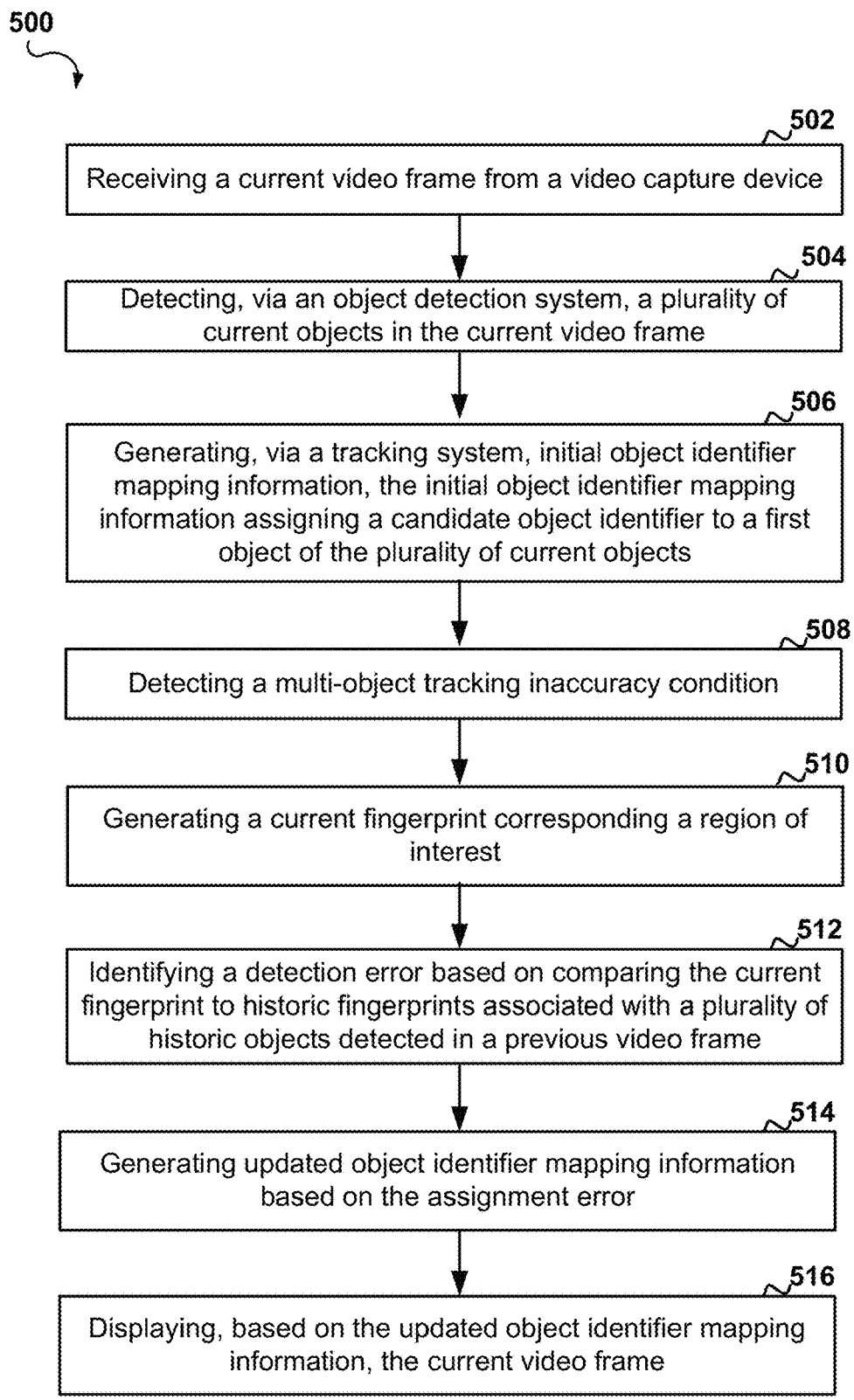
FIG. 5 is a flow diagram of a second example of a method of enhancing detection of occluded objects in a MOTS, according to some implementations.

Referring to FIG. 5, in operation, in the MOTS device 104 or computing device 600 may perform an example method 500 for enhancing detection of occluded objects in a MOTS. The method 500 may be performed by one or more components of the MOTS device 104, the computing device 600, or any device/component described herein according to the techniques described with reference to FIG. 1.

At block 502, the method 500 includes receive a current video frame from the video capture device. For instance, the MOTS device 104 may receive a video frame 116(4) from the video capture device 102 after having received the video frames 116(1)-(3) from the video capture device 102 at an earlier time. As an example, the video frame 116(4) may capture activity by or images of the customers 112(1)-(2) within the monitored area 110.

At block 504, the method 500 includes detect, via an object detection system, a plurality of current objects in the current video frame. For example, the object detection module 118 may detect the customers 112(1)-(2). In some aspects, the object detection module 118 may generate bounding boxes for each of the customers 112(1)-(2) detected within the video frame 116(4)

At block 506, the method 500 includes generating, via a tracking system, initial object identifier mapping information, the initial object identifier mapping information assigning a candidate object identifier to a first object of the plurality of current objects. For instance, the object tracking module 120 may generate candidate tracking information including assignments of a unique candidate object identifier to each of the customers 112(1)-(2) detected within the video frame 116(4) by the object detection module 118.

At block 508, the method 500 includes detecting a MOT inaccuracy condition. For example, the enhancement module 122 may determine that there has been an unexpected decrease in the amount of object identifiers between video frame 116(3) and video frame 116(4) as described with respect to FIG. 2A, and/or a potential occlusion based on a known occlusion location 270 within the monitored area 110 as described with respect to FIG. 2D.

At block 510, the method 500 includes generate a current fingerprint corresponding to a region of interest. For example, the enhancement module 122 may generate a fingerprint corresponding to the region of interest (e.g., the region of interest 272). In some aspects, generating a fingerprint may include generating an image histogram corresponding to the boundary box corresponding to the region of interest. Further, the image histogram may be based on intensity values within the region of interest. In some other aspects, generating a fingerprint may include generating a facial identifier corresponding to at least a portion of the region of interest.

At block 512, the method 500 includes identifying a detection error based on comparing the current fingerprint to historic fingerprints associated with a plurality of historic objects detected in a previous video frame. For example, the enhancement module 122 may determine that the fingerprint of the region of interest matches a historic fingerprint of customer 112(3) previously generated when the video frame 116(3) was processed by the MOTS device 104. In some aspects, comparing the fingerprint to the plurality of historic objects may be processor intensive. Therefore, limiting the fingerprint comparison to contexts in which the MOTS device 104 has detected a MOT inaccuracy condition improves the accuracy of the MOTS device 104 without significantly burdening the efficiency of the MOTS device 104.

At block 514, the method 500 includes generating updated object identifier mapping information. For example, the enhancement module 122 may update the candidate tracking information to reflect that the customer 112(3) has been detected within the region of interest. For instance, the generate new object information corresponding to the customer 112(3), and assign the object identifier previously assigned to the customer 112(3) to the new object information. Further, the enhancement module 122 update the tracking information 126 to include the updated candidate tracking information.

At block 516, the method 500 includes displaying, based on the updated object identifier mapping information, the current video frame. For example, the presentation module 124 may generate the enhanced video frame 130(4) with the object identifier of customer 112(3) displayed over the customer 112(3), and display the enhanced video frame 130(4) via the display device 106.

Although FIGS. 3-5 are discussed with respect to detecting and tracking the customers 112(1)-(N), in some other implementations the system 100 may perform enhanced detection and tracking as described in detail herein with respect to the other objects 114(1)-(N), or the customers 112(1)-(N), the other objects 114(1)-(N), and/or other persons located within the monitored area 110.

Figure 6:
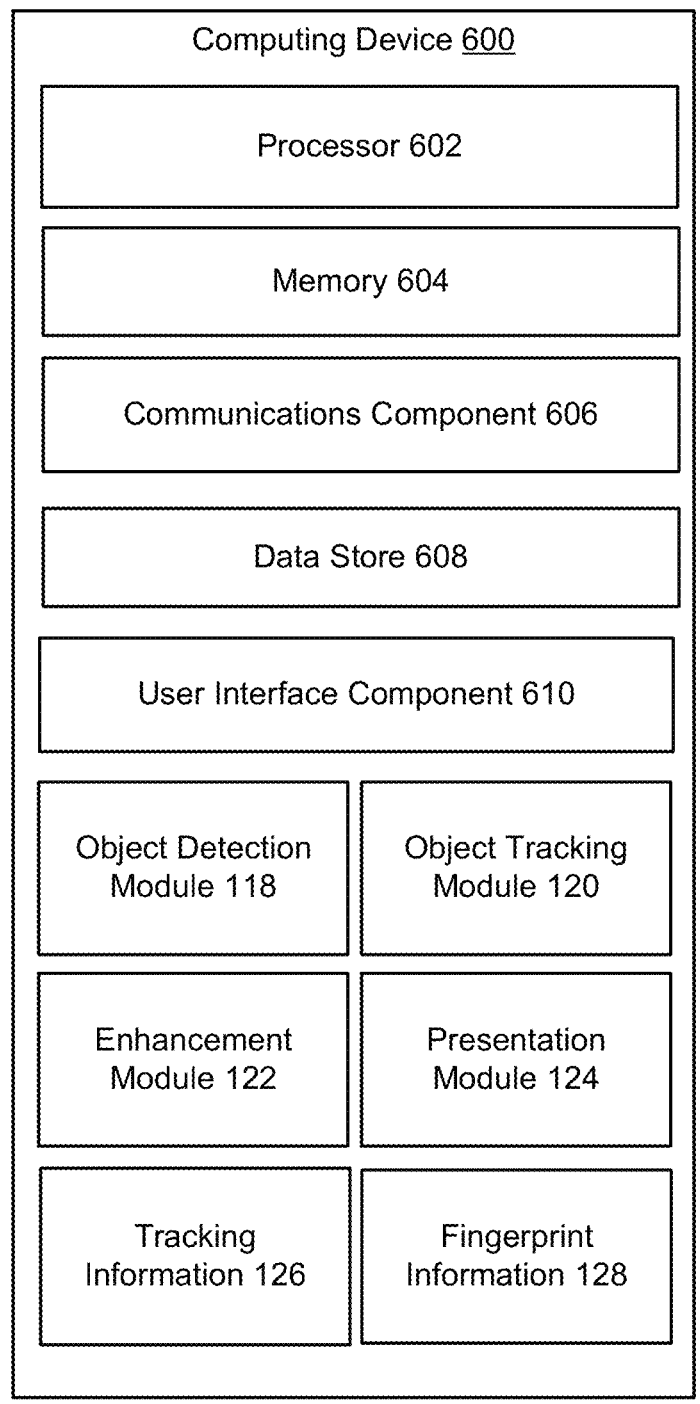
FIG. 6 is block diagram of an example of a computer device configured to enhance detection of occluded objects in a MOTS, according to some implementations.

Referring to FIG. 6, a computing device 600 may implement all or a portion of the functionality described herein. The computing device 600 may be or may include or may be configured to implement the functionality of at least a portion of the system 100, or any component therein. For example, the computing device 600 may be or may include or may be configured to implement the functionality of the plurality of the video capture devices 102, the MOTS device 104, and/or the display devices 106. The computing device 600 includes a processor 602 which may be configured to execute or implement software, hardware, and/or firmware modules that perform any functionality described herein. For example, the processor 602 may be configured to execute or implement software, hardware, and/or firmware modules that perform any functionality described herein with reference to the object detection module 118, the object tracking module 120, the enhancement module 122, and the presentation module 124, or any other component/system/device described herein.

The processor 602 may be a micro-controller, an application-specific integrated circuit (ASIC), a digital signal processor (DSP), or a field-programmable gate array (FPGA), and/or may include a single or multiple set of processors or multi-core processors. Moreover, the processor 602 may be implemented as an integrated processing system and/or a distributed processing system. The computing device 600 may further include a memory 604, such as for storing local versions of applications being executed by the processor 602, related instructions, parameters, etc. The memory 604 may include a type of memory usable by a computer, such as random access memory (RAM), read only memory (ROM), tapes, magnetic discs, optical discs, volatile memory, non-volatile memory, and any combination thereof. Additionally, the processor 602 and the memory 604 may include and execute an operating system executing on the processor 602, one or more applications, display drivers, and/or other components of the computing device 600.

Further, the computing device 600 may include a communications component 606 that provides for establishing and maintaining communications with one or more other devices, parties, entities, etc. utilizing hardware, software, and services. The communications component 606 may carry communications between components on the computing device 600, as well as between the computing device 600 and external devices, such as devices located across a communications network and/or devices serially or locally connected to the computing device 600. In an aspect, for example, the communications component 606 may include one or more buses, and may further include transmit chain components and receive chain components associated with a wireless or wired transmitter and receiver, respectively, operable for interfacing with external devices.

Additionally, the computing device 600 may include a data store 608, which can be any suitable combination of hardware and/or software, that provides for mass storage of information, databases, and programs. For example, the data store 608 may be or may include a data repository for applications and/or related parameters not currently being executed by processor 602. In addition, the data store 608 may be a data repository for an operating system, application, display driver, etc., executing on the processor 602, and/or one or more other components of the computing device 600.

The computing device 600 may also include a user interface component 610 operable to receive inputs from a user of the computing device 600 and further operable to generate outputs for presentation to the user (e.g., via a display interface to a display device). The user interface component 610 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 610 may include one or more output devices, including but not limited to a display interface, a speaker, a haptic feedback mechanism, a printer, any other mechanism capable of presenting an output to a user, or any combination thereof.

Further, while the figures illustrate the components and data of the a MOTS device 104 as being present in a single location, these components and data may alternatively be distributed across different computing devices and different locations in any manner. Consequently, the functions may be implemented by one or more service computing devices, with the various functionality described herein distributed in various ways across the different computing devices 600. Multiple computing devices 600 may be located together or separately, and organized, for example, as virtual servers, server banks and/or server farms. The described functionality may be provided by the servers of a single entity or enterprise, or may be provided by the servers and/or services of multiple different buyers or enterprises.

What is claimed is:

1. A method comprising:
   receiving a current video frame from a video capture device;
   detecting, via an object detection system, a plurality of current objects in the current video frame;
   generating, via a tracking system, initial object identifier mapping information, the initial object identifier mapping information assigning a candidate object identifier to a first object of the plurality of current objects;
   detecting a multi-object tracking (MOT) inaccuracy condition;
   generating, based on detection of the MOT inaccuracy condition, a current fingerprint corresponding to the first object of the plurality of current objects;
   determining that the current fingerprint corresponds to a historic fingerprint associated with a first object of a plurality of historic objects detected in a previous video frame, the first object of the plurality of historic objects associated with a final object identifier;
   generating updated object identifier mapping information, the updated object identifier mapping information assigning the final object identifier to the first object of the plurality of current objects; and
   displaying, based on the updated object identifier mapping information, the current video frame.

2. The method of claim 1, wherein the current video frame is a second video frame, and further comprising:
   detecting, via the object detection system, the plurality of historic objects in a first video frame received prior to the second video frame;
   generating historic object identifier mapping information, the historic object identifier mapping information assigning the final object identifier to the first object of the plurality of historic objects;
   detecting an absence of the MOT inaccuracy condition; and
   generating the historic fingerprint based on the absence of the MOT inaccuracy condition.

3. The method of claim 1, wherein generating the current fingerprint comprises:
   generating an image histogram corresponding to the first object of the plurality of current objects; or
   generating a facial identifier corresponding to a candidate face detected in the first object of the plurality of current objects.

4. The method of claim 1, wherein detecting the MOT inaccuracy condition, comprises identifying based on tracking information determined by the tracking system, the first object of the plurality of current objects within a threshold distance of an expected location of the first object of the plurality of historic objects.

5. The method of claim 1, wherein detecting the MOT inaccuracy condition, comprises identifying based on tracking information determined by the tracking system, the first object of the plurality of current objects within a threshold distance of an expected location of the first object of the plurality of historic objects.

6. The method of claim 1, wherein detecting the MOT inaccuracy condition, comprises determining, based on tracking information determined by the tracking system, that the first object of the plurality of current objects is located at an unexpected location.

7. The method of claim 1, wherein generating updated object identifier mapping information comprises disassociating the candidate object identifier from the first object of the plurality of current objects in response to determining that the current fingerprint corresponds to the historic fingerprint.

8. The method of claim 1, wherein the candidate object identifier is a previously unassigned identification number or sequence of characters.

9. A system comprising:
   a video capture device; and
   multi-object tracking platform comprising:
   a memory; and
   at least one processor coupled to the memory and configured to:
      receive a current video frame from the video capture device;
      detect, via an object detection system, a plurality of current objects in the current video frame;
      generate, via a tracking system, initial object identifier mapping information, the initial object identifier mapping information assigning a plurality of candidate object identifiers to the plurality of current objects;
      detect a multi-object tracking (MOT) inaccuracy condition;
      generate, based on detection of the MOT inaccuracy condition, a current fingerprint corresponding to a region of interest;

identify an assignment error based on comparing the current fingerprint to historic fingerprints associated with a plurality of historic objects detected in a previous video frame;

generate updated object identifier mapping information based on the assignment error; and display, based on the updated object identifier mapping information, the current video frame.

10. The system of claim 9, wherein to generate the current fingerprint, the at least one processor is configured to:

generate an image histogram corresponding to the region of interest; or generate a facial identifier corresponding to a candidate face detected in the region of interest.

11. The system of claim 9, wherein to detect the MOT inaccuracy condition, the at least one processor is configured to identify a decrease in a number of the plurality of current objects.

12. The system of claim 9, wherein to detect the MOT inaccuracy condition, the at least one processor is configured to determine that an expected location of a historic object of the plurality of historic objects is within a threshold distance of an occlusion location.

13. The system of claim 9, wherein to generate the updated object identifier mapping information based on the assignment error, the at least one processor is configured to:

assign a historic object identifier to a first object of the plurality of current objects, the historic object identifier previously corresponding to one of the plurality of historic objects.

14. The system of claim 9, wherein to generate the updated object identifier mapping information based on the assignment error, the at least one processor is configured to:

disassociate, based on the assignment error, a candidate object identifier of the plurality of candidate object identifiers from a first object of the plurality of current objects.

15. A non-transitory computer-readable device having instructions thereon that, when executed by at least one computing device, causes the at least one computing device to perform operations comprising:

receiving a current video frame from a video capture device;

detecting, via an object detection system, a plurality of current objects in the current video frame;

generating, via a tracking system, initial object identifier mapping information, the initial object identifier mapping information assigning a candidate object identifier to a first object of the plurality of current objects;

detecting a multi-object tracking (MOT) inaccuracy condition;

generating, based on detection of the MOT inaccuracy condition, a current fingerprint corresponding to the first object of the plurality of current objects;

determining that the current fingerprint corresponds to a historic fingerprint associated with a first object of a plurality of historic objects detected in a previous video frame, the first object of the plurality of historic objects associated with a final object identifier;

generating updated object identifier mapping information, the updated object identifier mapping information assigning the final object identifier to the first object of the plurality of current objects; and displaying, based on the updated object identifier mapping information, the current video frame.

16. The non-transitory computer-readable device of claim 15, wherein the current video frame is a second video frame, and the operations further comprising:

detecting, via the object detection system, the plurality of historic objects in a first video frame received prior to the second video frame;

generating historic object identifier mapping information, the historic object identifier mapping information assigning the final object identifier to the first object of the plurality of historic objects;

detecting an absence of the MOT inaccuracy condition; and generating the historic fingerprint based on the absence of the MOT inaccuracy condition.

17. The non-transitory computer-readable device of claim 15, wherein generating the current fingerprint comprises:

generating an image histogram corresponding to the first object of the plurality of current objects; or generating a facial identifier corresponding to a candidate face detected in the first object of the plurality of current objects.

18. The non-transitory computer-readable device of claim 15, wherein detecting the MOT inaccuracy condition, comprises identifying, based on tracking information determined by the tracking system, a potential crossing event between the first object of the plurality of current objects and a second object of the plurality of current objects.

19. The non-transitory computer-readable device of claim 15, wherein detecting the MOT inaccuracy condition, comprises determining, based on tracking information determined by the tracking system, that the first object of the plurality of current objects is located at an unexpected location.

20. The non-transitory computer-readable device of claim 15, wherein generating the updated object identifier mapping information comprises disassociating the candidate object identifier from the first object of the plurality of current objects.

* * * * *